United States Patent
Kim et al.

(10) Patent No.: US 8,027,311 B2
(45) Date of Patent: Sep. 27, 2011

(54) METHOD OF UPLINK PACKET SCHEDULING AND SUPPORTING THEREOF IN WIRELESS MOBILE COMMUNICATION SYSTEM

(75) Inventors: Hak Seong Kim, Seoul (KR); Bong Hoe Kim, Gyeonggi-do (KR); Joon Kui Ahn, Seoul (KR); Dong Youn Seo, Seoul (KR); Dong Wook Roh, Seoul (KR); Jung Hoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 637 days.

(21) Appl. No.: 12/092,558

(22) PCT Filed: Nov. 2, 2006

(86) PCT No.: PCT/KR2006/004537
§ 371 (c)(1),
(2), (4) Date: Oct. 13, 2008

(87) PCT Pub. No.: WO2007/052966
PCT Pub. Date: May 10, 2007

(65) Prior Publication Data
US 2009/0316648 A1 Dec. 24, 2009

(30) Foreign Application Priority Data
Nov. 4, 2005 (KR) .................. 10-2005-0105662

(51) Int. Cl.
*H04W 4/00* (2009.01)
*H04W 36/00* (2009.01)
*G06F 11/00* (2006.01)

(52) U.S. Cl. .................. 370/331; 455/437; 714/746
(58) Field of Classification Search .................. None
See application file for complete search history.

(56) References Cited

U.S. PATENT DOCUMENTS

| 2003/0152031 A1* | 8/2003 | Toskala et al. ............... 370/236 |
| 2005/0157680 A1* | 7/2005 | Zhang et al. ................. 370/331 |
| 2005/0250500 A1* | 11/2005 | Xu .............................. 455/442 |
| 2006/0018277 A1* | 1/2006 | Petrovic et al. ............... 370/329 |
| 2006/0072496 A1* | 4/2006 | Nakamata et al. ............ 370/328 |

FOREIGN PATENT DOCUMENTS
WO WO 2005/074308 * 8/2005
* cited by examiner

*Primary Examiner* — Nittaya Juntima
(74) *Attorney, Agent, or Firm* — Lee, Hong, Degerman, Kang & Waimey

(57) ABSTRACT

A method of uplink packet scheduling in a wireless mobile communications system and method of supporting the same are disclosed, scheduling efficiency can be enhanced in case that one base station schedules uplink packet transmission to a user equipment which is in soft handover with a plurality of base stations. A method of uplink packet scheduling, which is for a user equipment in a soft handover state in a wireless mobile communications system, includes the steps of transmitting a NACK signal in response to an uplink packet transmitted from the user equipment, receiving instruction information for a reception result of the uplink packet in at least one base station from the user equipment or at least one different base station, and performing the uplink packet scheduling for the user equipment by considering the instruction information.

5 Claims, 4 Drawing Sheets

METHOD OF UPLINK PACKET SCHEDULING AND SUPPORTING THEREOF IN WIRELESS MOBILE COMMUNICATION SYSTEM

CROSS-REFERENCE TO RELATED APPLICATIONS

This application is the National Stage filing under 35 U.S.C. §371 of International Application No. PCT/KR2006/004537, filed on Nov. 2, 2006, which claims the benefit of earlier filing date and right to priority to Korean Application No. 10-2005-0105662, filed on Nov. 4, 2005.

TECHNICAL FIELD

The present invention relates to a wireless mobile communication system, and more particularly, to a method of uplink packet scheduling in a wireless mobile communications system and method of supporting the same.

BACKGROUND ART

Generally, in packet communications between a base station and user equipments in a wireless mobile communications system, the base station schedules uplink packet transmissions for the user equipments. In particular, when user equipments transmits uplink packet to a base station, the base station decides portions and types of resources (time, code, frequency, transmission power, etc.) for entire uplink packet transmissions to be used by a specific user equipment in transmitting a certain volume of data at a specific timing point by considering transmission buffer states and service priorities of user equipments belonging to the base station and an uplink channel status of a user equipment to be scheduled and the like overall. The base station then informs the specific user equipment of the decision via a scheduling command. Subsequently, the user equipment having received the scheduling command performs the uplink packet transmission according to the corresponding command. In this manner, the base station is able to enhance uplink packet transmission efficiency better than that in case of absence of base station scheduling by quickly and appropriately adjusting resource allocation for uplink packet transmissions of the user equipments belonging to the corresponding base station.

In a cellular wireless communications system, when a user equipment is located in the vicinity of a boundary of a cell covered by a base station (or sector) with which packet transmission/reception is performed, considerable quantity of power is required for the packet transmission/reception. So, there exist considerable amount of transmission power losses of the base station and user equipment. Moreover, interference with neighbor cells considerably grows due to the packet transmissions of large transmission power between the base station and the user equipment. To reduce such a bad influence, the user equipment located in the vicinity of the cell boundary is allowed to perform packet transmissions/receptions with a plurality of cells existing in an area capable of covering the corresponding user equipment as well as one cell, which is called soft handover.

FIG. 1 is a diagram to explain a soft handover method according a related art.

Referring to FIG. 1, while a user equipment is in a soft handover state with a plurality of base stations in uplink, if the user equipment performs a packet transmission in uplink, each of the base stations (or sectors) with which the user equipment is in the soft handover state receives the transmitted packet, decodes the received packet and then transmits the decoded data to a central control station via a wire network. The central control station collects data free from reception error from the received data and then transfers the collected data to a data network. In this case, the central control station can be an entity such as a specific base station (or sector) among the base stations (or sectors) in soft handover, a radio network controller (RNC) existing separate from base stations. So, even if the packet reception succeeds in one of a plurality of cells, data of the corresponding packet is correctly transferred to the data network. Compared to a case of a packet transmission to one cell from a user equipment, this case is able to bring the same transmission efficiency with less transmission power.

Meanwhile, a scheduling cell, which schedules a user equipment, should perform scheduling to enable the specific user equipment to retransmit an uplink packet at a next timing in case of failing to receive the uplink packet transmitted by the specific user equipment or to consider retransmission of an uplink packet having been transmitted by the user equipment. However, in case that the specific user equipment is in handover with a different cell as well as the scheduling cell in uplink, once the different cell having succeeded in receiving the packet transmits an ACK signal to the specific user equipment, the specific user equipment may not retransmit the corresponding packet to the scheduling cell. In this case, if the scheduling cell empties uplink resources (uplink power, frequency-time resource, etc.) by expecting the retransmission of the corresponding packet, the uplink resources are wasted and the scheduling becomes inefficient.

DISCLOSURE OF THE INVENTION

Accordingly, the present invention is directed to a method of uplink packet scheduling in a wireless communications system and method of supporting the same that substantially obviate one or more of the problems due to limitations and disadvantages of the related art.

An object of the present invention is to provide a method of uplink packet scheduling in a wireless communications system and method of supporting the same, scheduling efficiency can be enhanced in case that one base station schedules uplink packet transmission to a user equipment which is in soft handover with a plurality of base stations.

Another object of the present invention is to provide a method of uplink packet scheduling in a wireless communications system and method of supporting the same, by which limited radio resources can be efficiently used in the wireless mobile communications system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of uplink packet scheduling, which is for a user equipment in a soft handover state in a wireless mobile communications system, according to the present invention includes the steps of transmitting a non-acknowledgement (NACK) signal as a response to an uplink packet transmitted from the user equipment, receiving instruction information for a reception result of the uplink packet in at least one base station from the user equipment or the at least one base station, and performing the uplink packet scheduling for the user equipment in a consideration of the instruction information.

To further achieve these and other advantages and in accordance with the purpose of the present invention, a method of supporting uplink packet scheduling, which is for a user equipment in a soft handover state in a wireless mobile communications system, includes the steps of receiving a non-acknowledgement (NACK) signal for an uplink packet transmitted by the user equipment from a scheduling base station, receiving a result of a reception for the uplink packet from at least one different base station, and transmitting instruction information for the result of the reception for the uplink packet in the at least one different base station to the scheduling base station.

To further achieve these and other advantages and in accordance with the purpose of the present invention, a method of supporting uplink packet scheduling, which is for a user equipment in a soft handover state in a wireless mobile communications system, includes the steps of receiving a non-acknowledgement (NACK) signal for an uplink packet transmitted by the user equipment from a scheduling base station, receiving an acknowledgement (ACK) signal for the uplink packet transmitted by the user equipment from at least one different base station, and transmitting instruction information indicating to switch a specific base station succeeding in a reception of the uplink packet to the scheduling base station.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
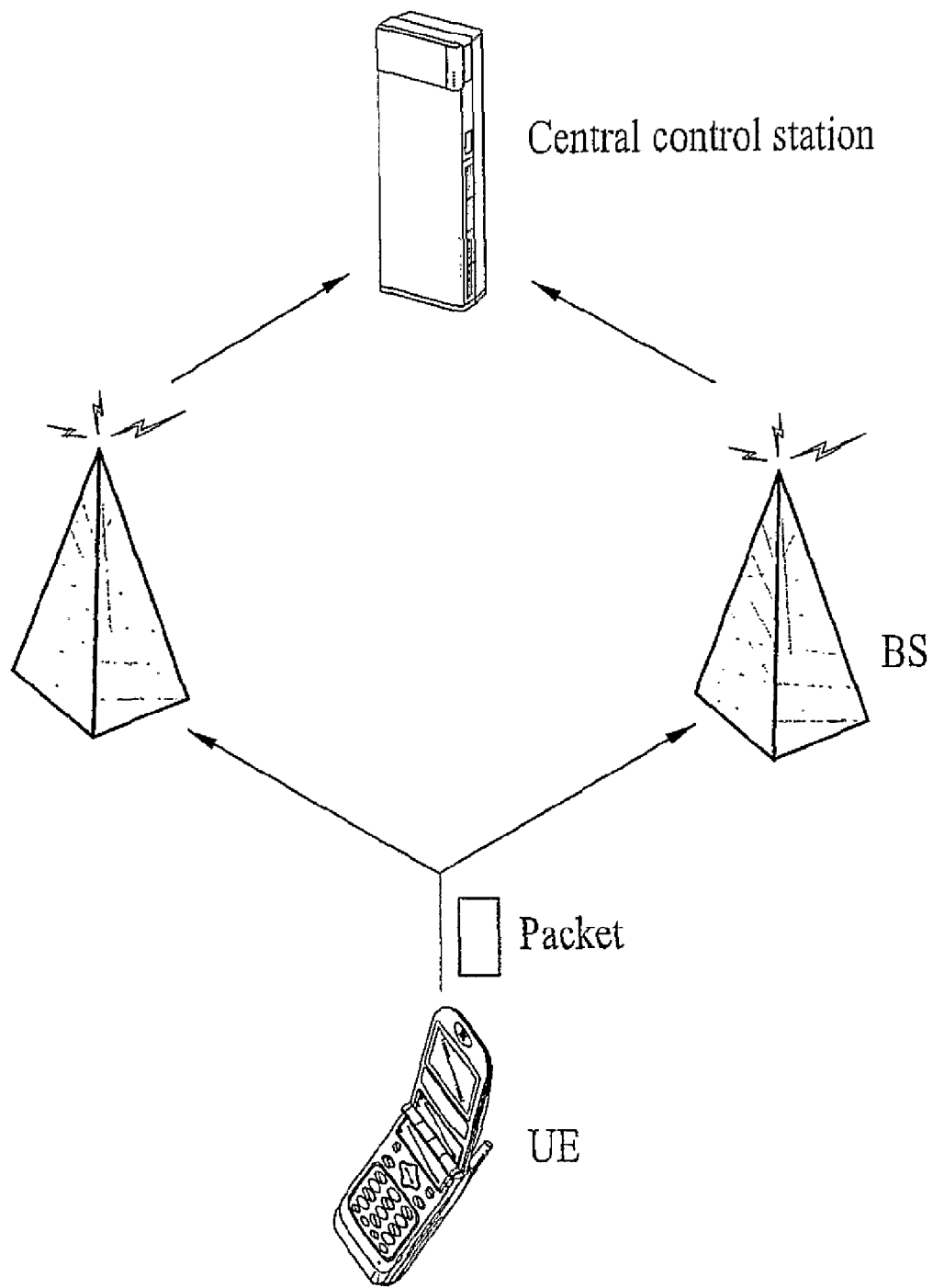
FIG. 1 is a diagram for explaining a soft handover method according a related art.
Figure 2A:
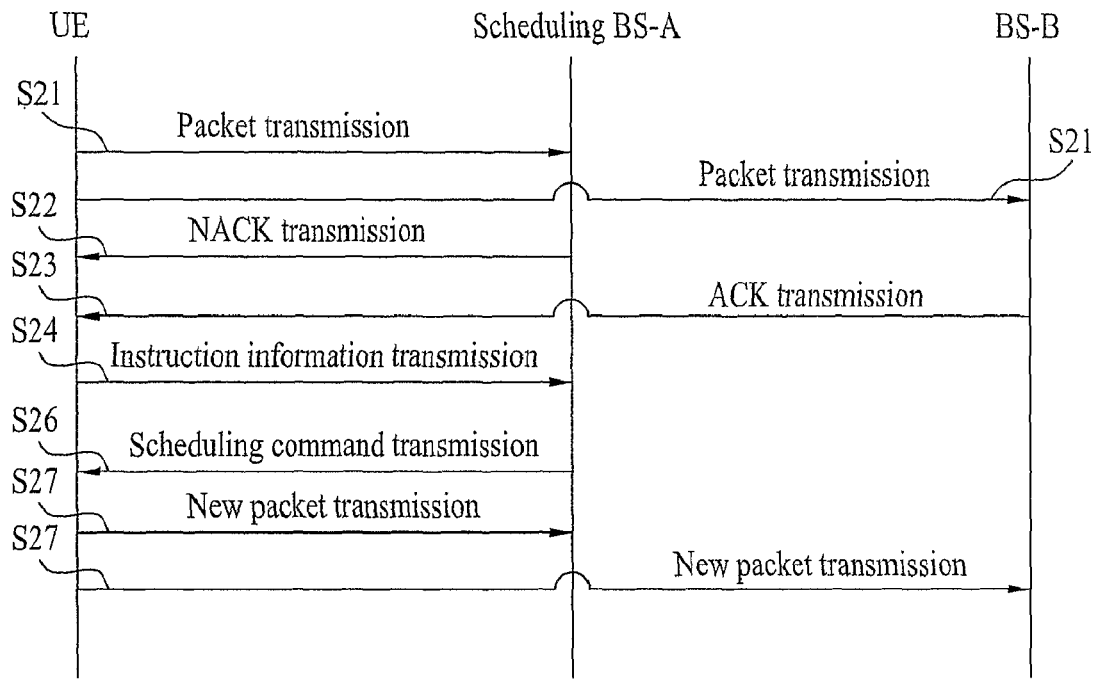
FIG. 2A is a flowchart of a method according to one preferred embodiment of the present invention.

FIG. 2A is a flowchart of a method according to one preferred embodiment of the present invention.

Referring to FIG. 2A, a user equipment in a soft handover state transmits an uplink packet to at least two or more base stations including a scheduling base station-A and a base station-B (S21). The uplink base station-A is a base station which decides a volume and transmitting timing point of data to be transmitted by a specific user equipment and a type and quantity of a resource (time, code, frequency, transmission power, etc.) for an entire uplink packet transmission in a consideration of a quantity of uplink interference working on the uplink base station-A, transmitting buffer states of user equipments belonging to the base station-A, service priorities of the user equipments, an uplink channel status of the user equipments to be scheduled and the like and then informs the user equipments of the decision via a scheduling command.

If the scheduling base station-A is unable to smoothly receive the uplink packet transmitted from the user equipment due to error occurrence on an uplink channel carrying the uplink packet and the like, the scheduling base station-A transmits a non-acknowledgement (NACK) signal to the user equipment according to ARQ (automatic retransmission request) or H-ARQ (hybrid-ARQ) scheme (S22). In case that the base station-B differing from the scheduling base station-A among the base stations in the soft handover state with the user equipment successfully receives the packet transmitted by the user equipment, the base station-B transmits an acknowledgement (ACK) signal to the user equipment.

Figure 2B:
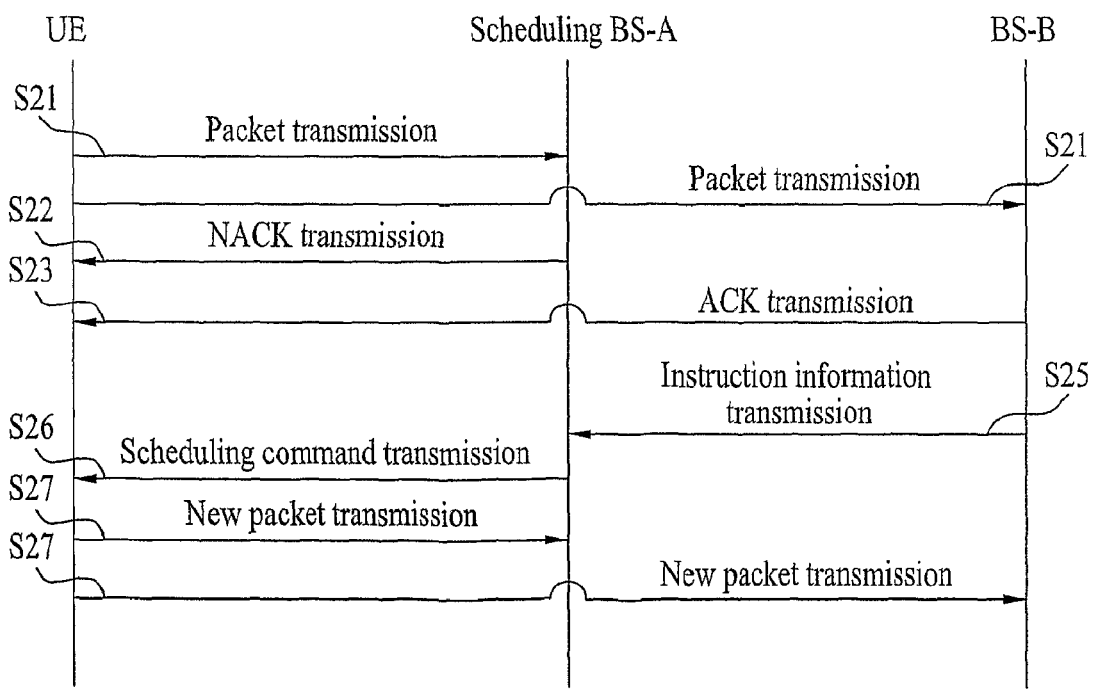
FIG. 2B is a flowchart of a method according to another preferred embodiment of the present invention.

Having received the ACK signal from the base station-B, the user equipment transmits instruction information instructing that the base station-B has succeeded in receiving the uplink packet to the scheduling base station-A (S24). In this case, it is able to transmit the instruction information to the rest of the base stations with which the user equipment is in the soft handover state. Alternatively, instead of transmitting the instruction information from the user equipment, the base station-B is able to transmit the instruction information to the scheduling base station-A (cf. 'S25' in FIG. 2B). It is also possible for both of the user equipment and the base station-B to transmit the instruction information to the scheduling base station-A.

In spite of transmitting the NACK signal for the uplink packet having been transmitted from the user equipment, the scheduling base station-A having received the instruction information from the base station-B (or the user equipment) transmits a scheduling command for a new packet to be transmitted next to the user equipment on an assumption that the scheduling base station-A has successfully received the uplink packet instead of allocating uplink resources to receive a retransmission packet to be transmitted by the user equipment (S27). The user equipment transmits a new uplink packet to at least one of the base stations according to the scheduling command received from the scheduling base station-A (S27).

Figure 3:
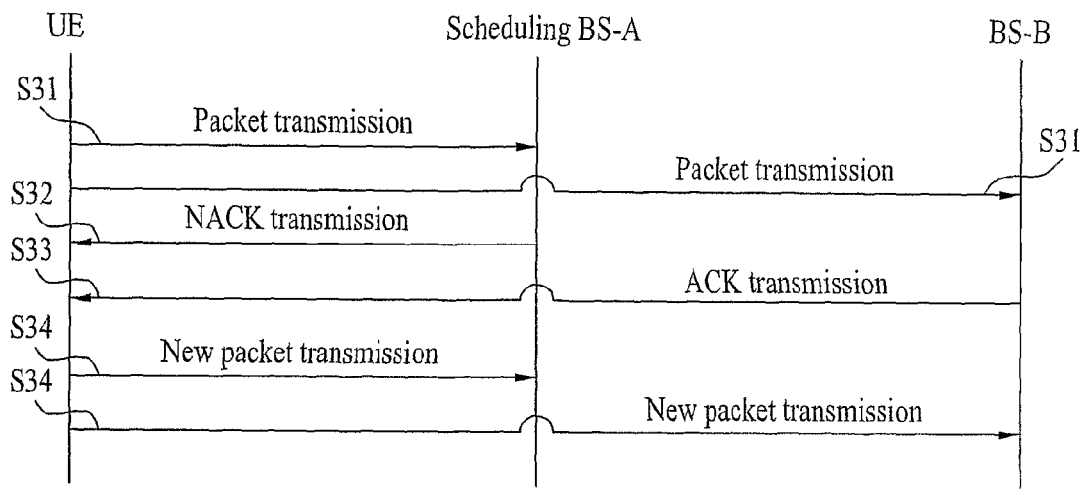
FIG. 3 is a flowchart of a method according to another preferred embodiment of the present invention.

FIG. 3 is a flowchart of a method according to another preferred embodiment of the present invention.

Referring to FIG. 3, a user equipment transmits an uplink packet to at least two or more base stations including a scheduling base station-A (S31). The user equipment then receives a NACK signal from the scheduling base station-A (S32) and an ACK signal from a base station-B (S33), which is the same situation shown in FIG. 2.

In case of not receiving separate information from the user equipment or other base stations, the scheduling base station-A shall decide that the user equipment receives the NACK signal transmitted by the scheduling base station-A itself and that the user equipment will retransmit the uplink packet. So, the scheduling base station-A will allocate uplink resources (frequency, time, code, power, etc.) for receiving the retransmission packet. And, the scheduling base station-A is able to transmit a separate scheduling command for the retransmission packet to the user equipment. Alternatively, uplink resources allocated for the uplink packet having been initially transmitted may be allocated without separate scheduling. The user equipment may transmit a new uplink packet within a range below the uplink resources to be allocated to the retransmission packet by a pre-negotiated method to the at least one base station (S34). The scheduling base station-A is able to successfully receive the new uplink packet since the uplink resources for the retransmission packet have been already allocated.

Figure 4:
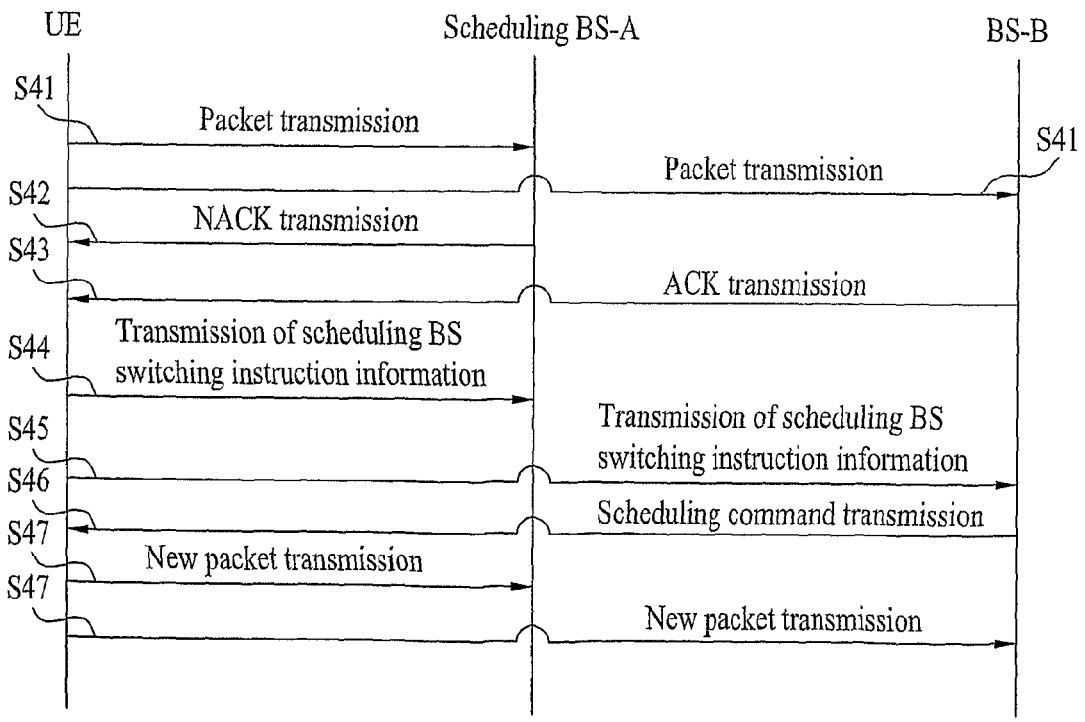
FIG. 4 is a flowchart of a method according to another preferred embodiment of the present invention.

FIG. 4 is a flowchart of a method according to another preferred embodiment of the present invention.

Referring to FIG. 4, a user equipment transmits an uplink packet to at least two or more base stations including a scheduling base station-A (S41). The user equipment then receives a NACK signal from the scheduling base station-A (S42) and an ACK signal from a base station-B (S43), which is the same situation shown in FIG. 2 or FIG. 3.

In this case, the user equipment decides that a channel situation with the base station-B is better than a channel situation with the scheduling base station-A and then transmits instruction information indicating to switch the scheduling base station to the base station-B from the base station-A (S44, S45). The scheduling base station-A and the base station-B having received the instruction information perform a fast cell switching process. Thereafter, the base station-B becomes a scheduling base station to schedule an uplink packet transmission of the user equipment. So, if the base station-B transmits a scheduling command to the user equipment (S46), the user equipment transmits a new packet according to the received scheduling command (S47). By this method, the scheduling base station is able to know a presence or non-presence of necessity for a packet retransmission of the user equipment and a selection for the scheduling base station can be fast switched to a base station having a good uplink status. Hence, scheduling efficiency can be enhanced.

Figure 5:
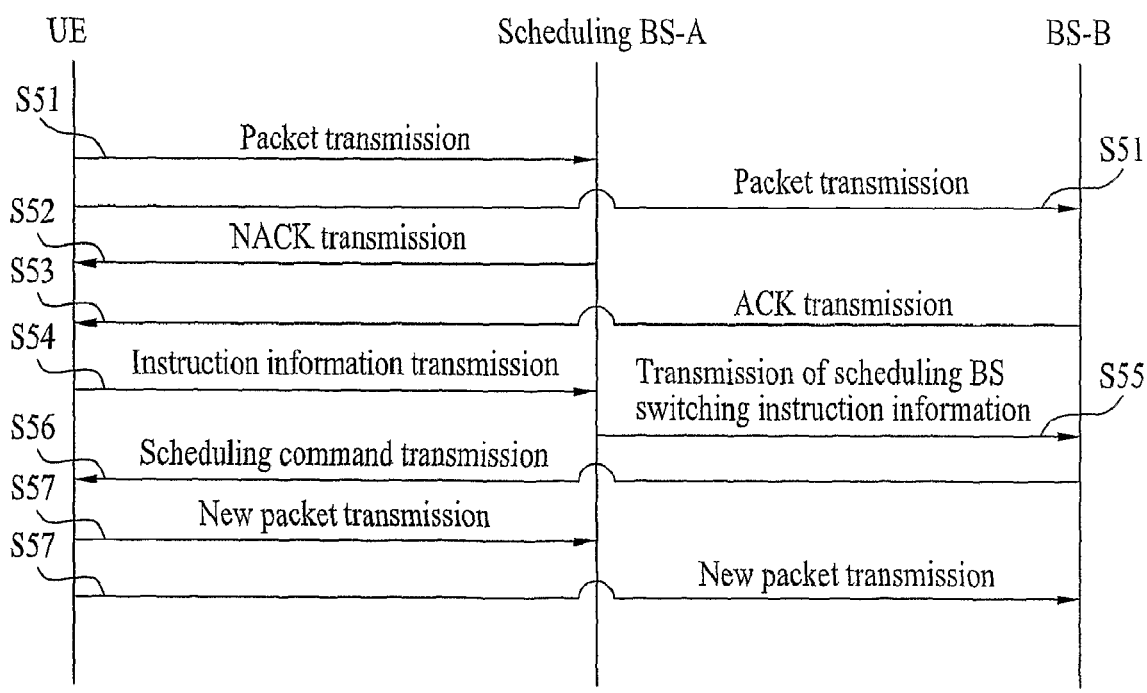
FIG. 5 is a flowchart of a method according to a further preferred embodiment of the present invention.

FIG. 5 is a flowchart of a method according to a further preferred embodiment of the present invention.

Referring to FIG. 5, a user equipment transmits an uplink packet to at least two or more base stations including a scheduling base station-A (S51). The user equipment then receives a NACK signal from the scheduling base station-A (S52) and an ACK signal from a base station-B (S53), which is the same situation shown in FIG. 2, FIG. 3, or FIG. 4.

Having received the ACK signal from the base station-B, the user equipment transmits instruction information indicating that the base station-B has succeeded in a reception of the uplink packet, to the scheduling base station-A (S54). The scheduling base station-A then transmits instruction information, which indicates to switch a scheduling base station to the base station-B from the base station-A, to the base station-B (S55). The scheduling base station-A and the base station-B having received the instruction information perform a fast cell switching process. Thereafter, the base station-B becomes a scheduling base station to schedule an uplink packet transmission of the user equipment. So, if the base station-B transmits a scheduling command to the user equipment (S56), the user equipment transmits a new packet according to the received scheduling command (S57).

If a user equipment is in a soft handover state with a plurality of base stations in a wireless mobile communication system, when one of the base stations schedules an uplink packet transmission of the user equipment, scheduling efficiency can be enhanced and radio resources can be efficiently used.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention provides the following effects or advantages.

The invention claimed is:

1. A method of supporting uplink packet scheduling for a user equipment in a soft handover state in a wireless mobile communications system, the method comprising:
receiving a non-acknowledgement (NACK) signal from a scheduling base station for an uplink packet transmitted by the user equipment;
receiving a result of a reception for the uplink packet from at least one different base station;
transmitting instruction information for the result of the reception in the at least one different base station to the scheduling base station; and
transmitting the instruction information for the result of the reception in the at least one different base station to at least one different base station in performing a soft handover,
wherein the instruction information indicates that the at least one different base station succeeds in receiving the uplink packet.

2. The method of claim 1, further comprising:
receiving scheduling information for a new uplink packet from the at least one different base station; and
transmitting the new uplink packet according to the scheduling information.

3. The method of claim 1, wherein the instruction information further indicates to change the at least one different base station succeeding in the reception of the uplink packet into a scheduling base station.

4. The method of claim 1, wherein the instruction information further indicates to switch the scheduling base station to the at least one different base station succeeding in the reception of the uplink packet.

5. The method of claim 4, further comprising:
receiving scheduling information for a new uplink packet from the switched scheduling base station; and
transmitting the new uplink packet according to the scheduling information.

* * * * *